(12) United States Patent
Wang et al.

(10) Patent No.: US 8,243,438 B2
(45) Date of Patent: Aug. 14, 2012

(54) ELECTRONIC APPARATUS

(75) Inventors: He-Li Wang, Shenzhen (CN); Hong Li, Shenzhen (CN); Ting Zhang, Shenzhen (CN); Ting-Ting Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 868 days.

(21) Appl. No.: 12/127,021

(22) Filed: May 27, 2008

(65) Prior Publication Data

US 2009/0079723 A1    Mar. 26, 2009

(30) Foreign Application Priority Data

Sep. 26, 2007   (CN) .......................... 2007 1 0201863

(51) Int. Cl.
*H05K 5/00* (2006.01)
*H05K 7/00* (2006.01)

(52) U.S. Cl. ......... 361/679.55; 361/679.27; 361/679.28; 345/212; 292/151

(58) Field of Classification Search .................. 345/212; 292/151; 361/679.27, 679.28, 679.55
See application file for complete search history.

(56) References Cited

U.S. PATENT DOCUMENTS

| | | | | |
|---|---|---|---|---|
| 6,044,473 | A * | 3/2000 | Kim | 713/320 |
| 6,243,472 | B1 * | 6/2001 | Bilan et al. | 381/117 |
| 2003/0081395 | A1 * | 5/2003 | Katagiri | 361/800 |
| 2004/0150972 | A1 * | 8/2004 | Chen | 361/800 |
| 2004/0227407 | A1 * | 11/2004 | Nagai | 307/112 |
| 2005/0167992 | A1 * | 8/2005 | Lo et al. | 292/251.5 |
| 2005/0236848 | A1 * | 10/2005 | Kim | 292/251.5 |
| 2006/0254339 | A1 * | 11/2006 | Satterlee et al. | 72/705 |
| 2007/0120829 | A1 | 5/2007 | Ono | |
| 2008/0186683 | A1 * | 8/2008 | Ligtenberg et al. | 361/726 |
| 2011/0299235 | A1 * | 12/2011 | Liu et al. | 361/679.09 |

\* cited by examiner

*Primary Examiner* — Anthony Haughton
(74) *Attorney, Agent, or Firm* — Altis Law Group, Inc.

(57) ABSTRACT

An electronic apparatus (10) includes a main body (30), a lid (20) pivotably connected with a side of the main body, a magnetic detecting unit (40) and a magnetic shield member (28). The detecting unit includes a magnetic body (42) mounted on one of the main body or the lid and a magnetic detector (44) mounted on the other one of the main body or the lid, respectively. The magnetic body has a facing side (421) to face the magnetic detector. The magnetic detector detects a position of the lid according to a magnetic field intensity of the magnetic body. The magnetic shield member is disposed at a distance from the facing side and adjacent to a second side (422) of the magnetic body, to prevent the magnetic field from extending in the direction of the second side of the magnetic body.

13 Claims, 6 Drawing Sheets

US 8,243,438 B2

ELECTRONIC APPARATUS

BACKGROUND

1. Technical Field

The present invention generally relates to power saving switches, and more particularly to a magnetic power saving switch for a portable electronic apparatus.

2. Description of Related Art

In recent years, portable electronic devices such as mobile phones, personal data assistants (PDA), hand-held computers, and notebook computers have been widely used due to their convenience and practicality. In general, the display component of these portable electronic devices consumes an inordinate amount of energy when the portable electronic devices are operated. The best way to save energy is by powering off the screen while keeping the portable electronic device operated when not in use. This will help extend the life of the screen and decrease electromagnetic radiation from the screen.

One technique of turning off the display when the lid is closed is by a controlling switch. Portable electronic devices include a main body and a lid pivotably connected to one side of the main body. The display is embedded in the lid. The controlling switch includes a magnetic body mounted on the lid and a magnetic detector mounted on the main body. The magnetic detector detects the position of the lid according to a magnetic field intensity of the magnetic body. For example, when the lid rotates from an open position to a closed position, the magnetic detector gradually detects a stronger magnetic field, and outputs a signal to turn off the display when the magnetic field is strong enough, that is when the lid is almost in a closed position.

Magnetic substances, such as metal keys, near or adjacent to the portable electronic device may affect the strength of the magnetic detector. As such the display may not turn off even when the lid is very close to the magnetic detector and the display will consume power even when the lid is closed. Thus, these magnetic substances next to the portable electronic device manually, may cause great inconvenience to the user.

Therefore, a reliable screen controlling switch for controlling the screen to turn on or turn off is needed.

SUMMARY

The present invention relates to an electronic apparatus. The electronic apparatus includes a main body, a lid, a magnetic detecting unit and a magnetic shield member. The lid is pivotably connected with a side of the main body to rotate with respect to the main body between an open position and a close position. The detecting unit includes a magnetic body and a magnetic detector. The detecting unit is mounted on one of the main body or the lid and the magnetic detector is mounted on the other one of the main body or the lid, respectively. The magnetic body has a facing side to face the magnetic detector. The magnetic detector detects a position of the lid according to a magnetic field intensity of the magnetic body. The magnetic shield member is disposed at a distance from the facing side and adjacent to a second side of the magnetic body, to prevent the magnetic field from extending in the direction of the second side of the magnetic body.

Other advantages and novel features of the present invention will become more apparent from the following detailed description of embodiment when taken in conjunction with the accompanying drawings.

DETAILED DESCRIPTION OF THE EMBODIMENTS

Figure 1:
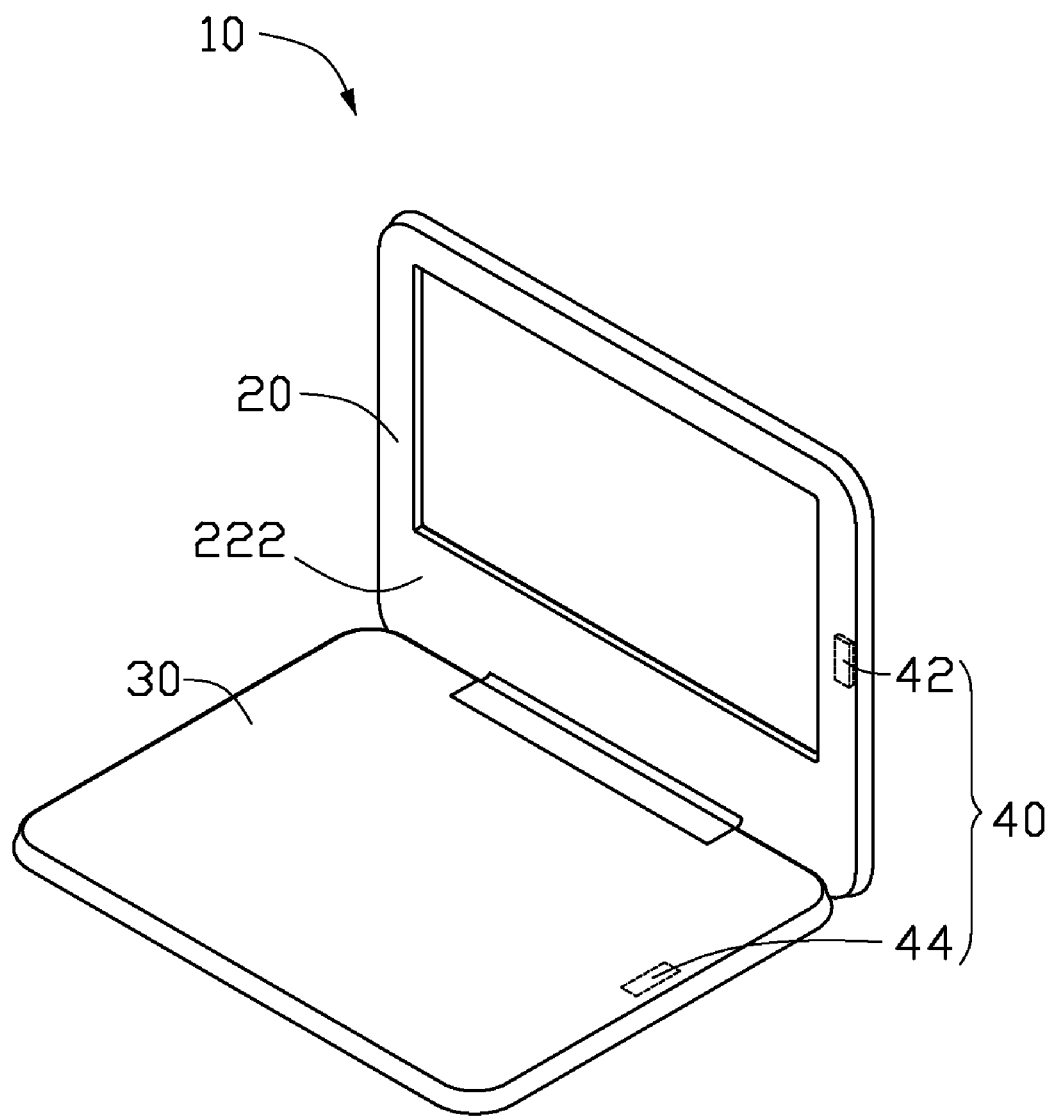
FIG. 1 an isometric view showing an electronic apparatus in accordance with an embodiment of the present invention.

Reference will now be made to the drawing figures to describe the various present embodiments in detail.

Referring to FIG. 1, an electronic apparatus 10 includes a main body 30, a lid 20 and a magnetic detecting unit 40. The lid 20 is pivotably connected to a rear side of the main body 30. The lid 20 is pivotable with respect to the main body 30, so that the lid 20 can be rotated between an open position and a closed position according to user's requirements.

The magnetic detecting unit 40 includes a magnetic body 42 and a magnetic detector 44. The magnetic body 42 is mounted on the lid 20. The magnetic detector 44 is mounted on the main body 30. The magnetic detector 44 faces the magnetic body 42 of the lid 20 when the lid 20 is in the closed position. Alternatively, the locations of the magnetic body 42 and the magnetic detector 44 can be interchangeable.

Figure 2:
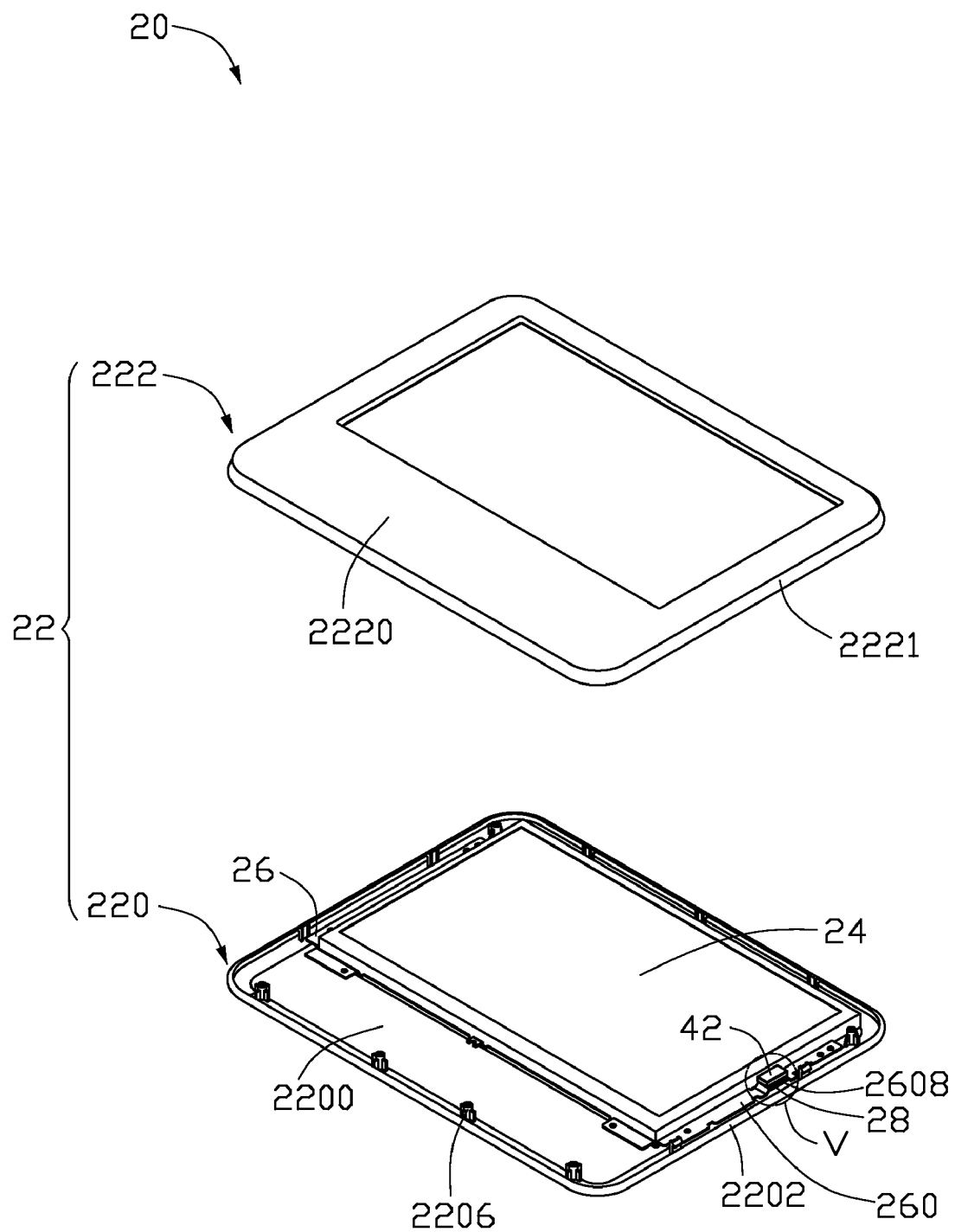
FIG. 2 is an exploded, isometric view of a lid of the electronic apparatus of FIG. 1.

Referring to FIG. 2, the lid 20 includes a shell 22, a screen 24, a fixing frame 26 and a magnetic shield member 28.

Figure 3:
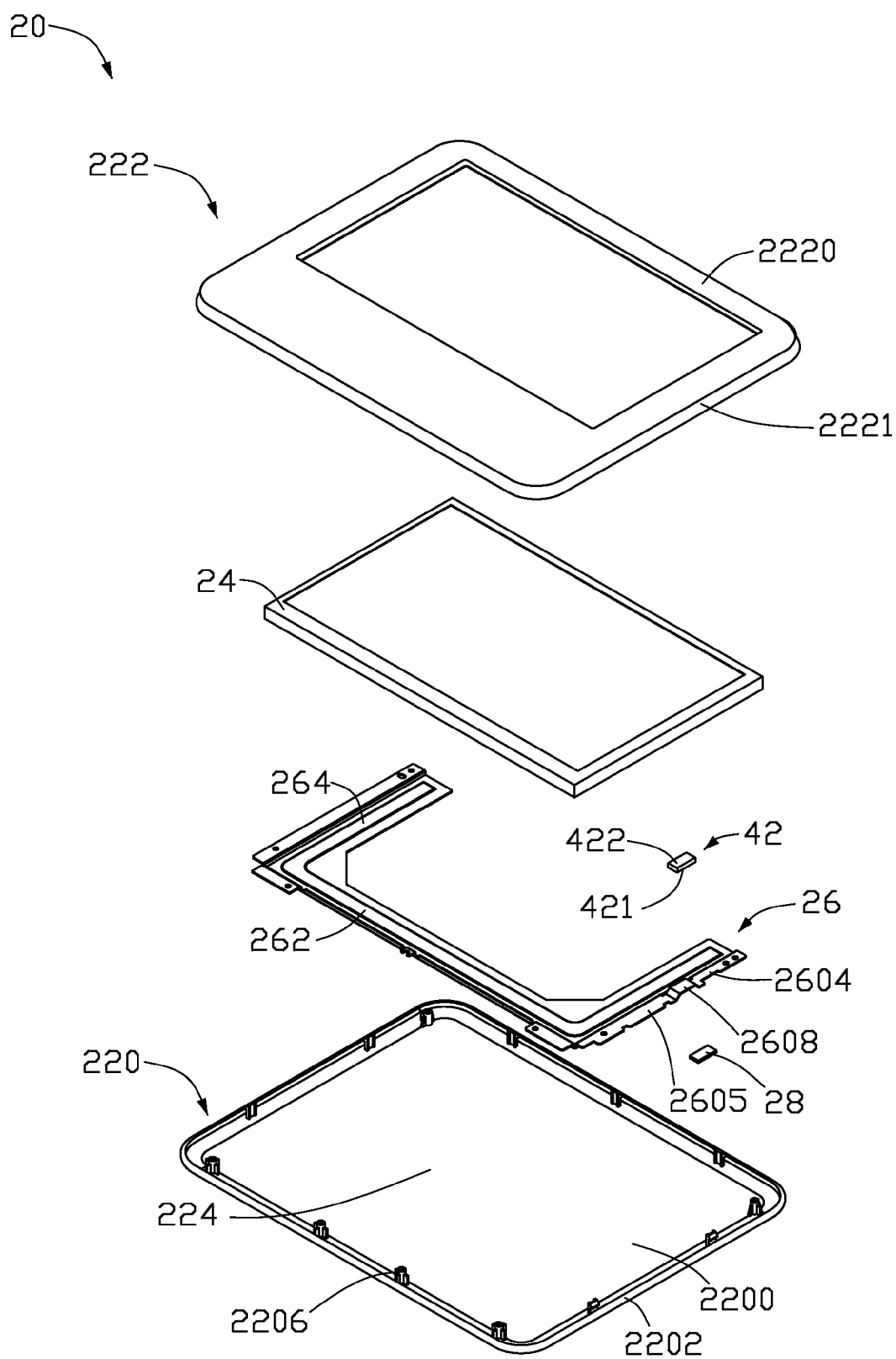
FIG. 3 is an exploded, isometric view of the lid of the electronic apparatus of FIG. 2.
Figure 4:
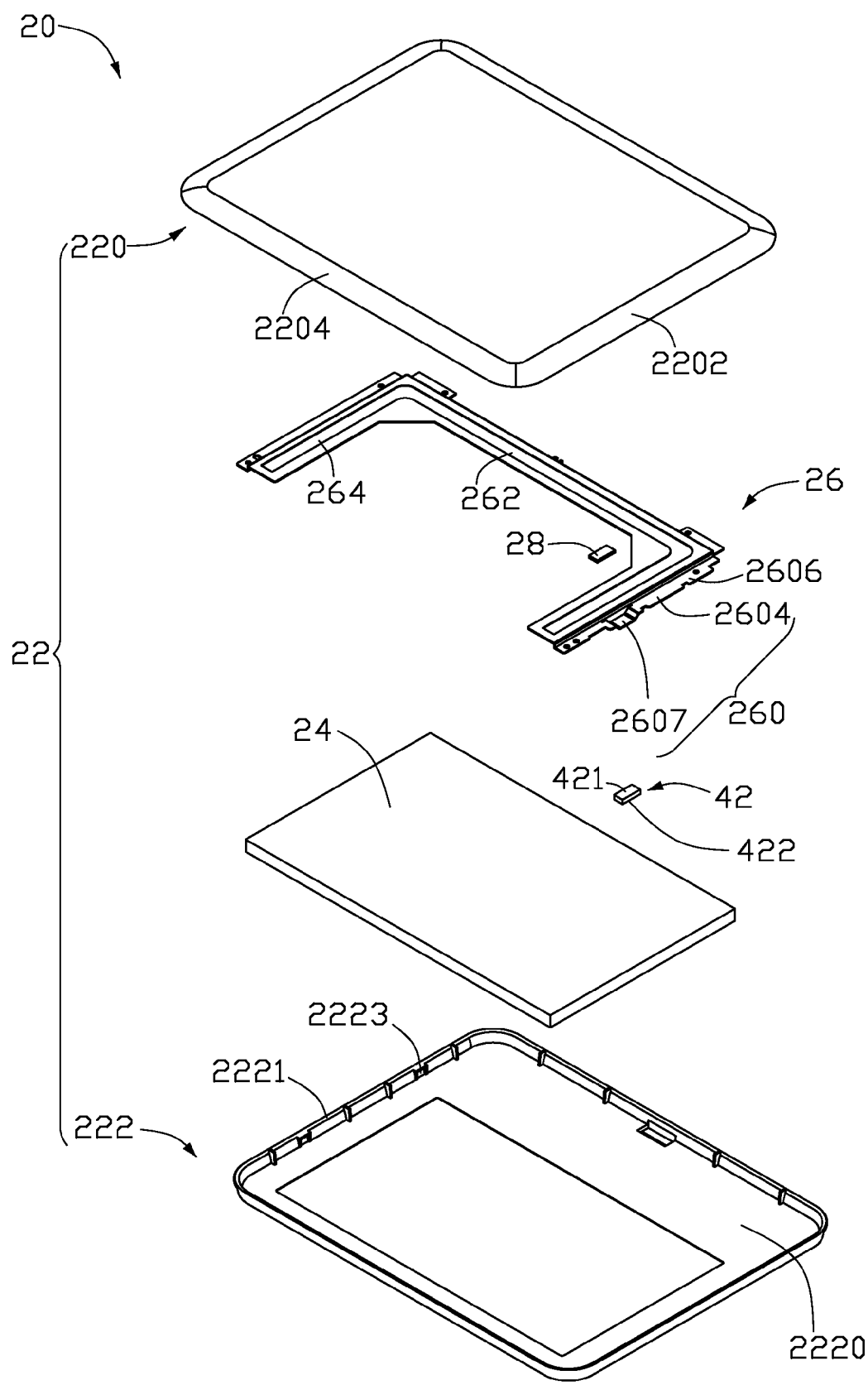
FIG. 4 is an exploded, isometric view of the lid of the electronic apparatus similar to FIG. 3, but viewed from a different aspect.

The shell 22 includes a top cover 222 and a bottom cover 220. The top cover 222 includes a rectangular-shaped top wall 2220 and four sidewalls 2221 perpendicularly and downwardly extending from a periphery of the top wall 2220. Further referring to FIGS. 3, 4, a plurality of receiving holes 2223 are defined in the sidewalls 2221 of the top cover 2220. The bottom cover 220 has a similar configuration as the top cover 222, and includes four sidewalls 2202 upwardly extending toward the four sidewalls 2221 of the top cover 222 and a rectangular-shaped bottom wall 2200 correspondingly. A plurality of fixing poles 2206, which correspond to the plurality of receiving holes 2223 of the top cover 222 correspondingly, are formed on the sidewalls 2202 of the bottom cover 220. When assembled, the fixing poles 2206 of the bottom cover 220 are correspondingly received in the receiving holes 2223 of the top cover 222 to fasten the top cover 222 and the bottom cover 220 together. The top cover 222 and the bottom cover 220 cooperatively define an inner space (not labeled) for receiving the screen 24, the fixing frame 26, the magnetic body 42 and the magnetic shield member 28 therein.

Figure 5:
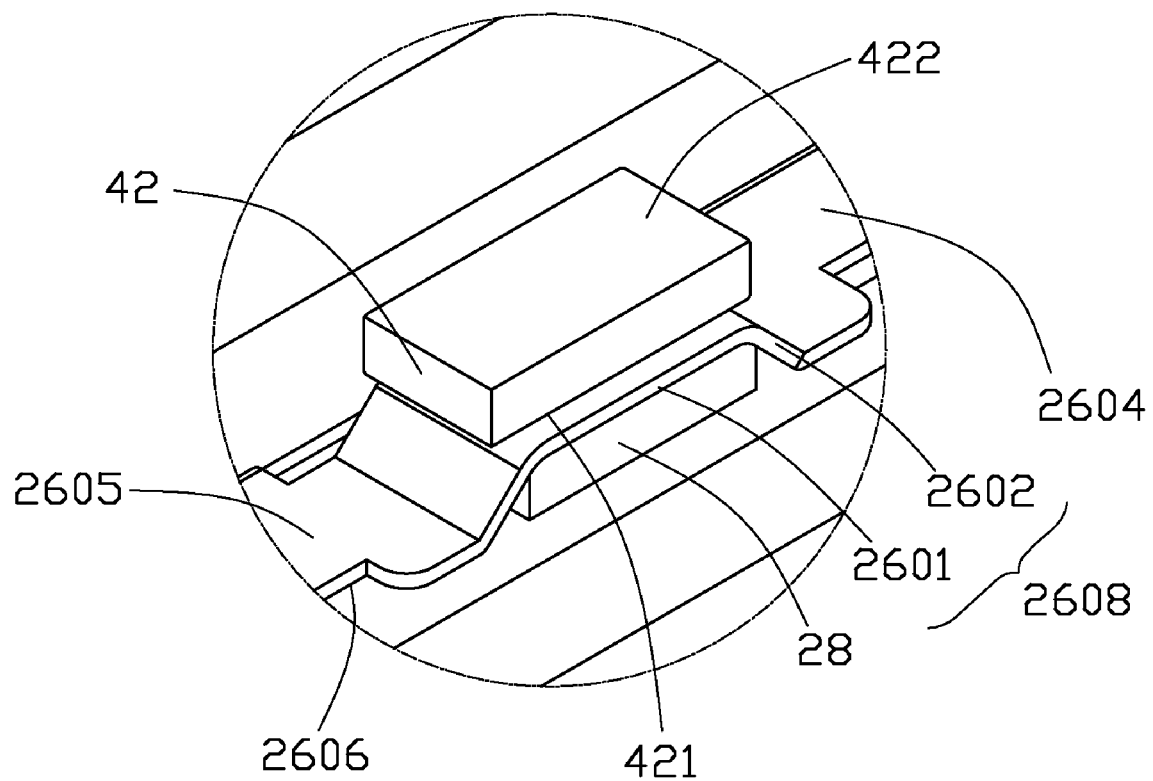
FIG. 5 is an enlarged view of a fixing frame of the lid of FIG. 2, circled by V.
Figure 6:
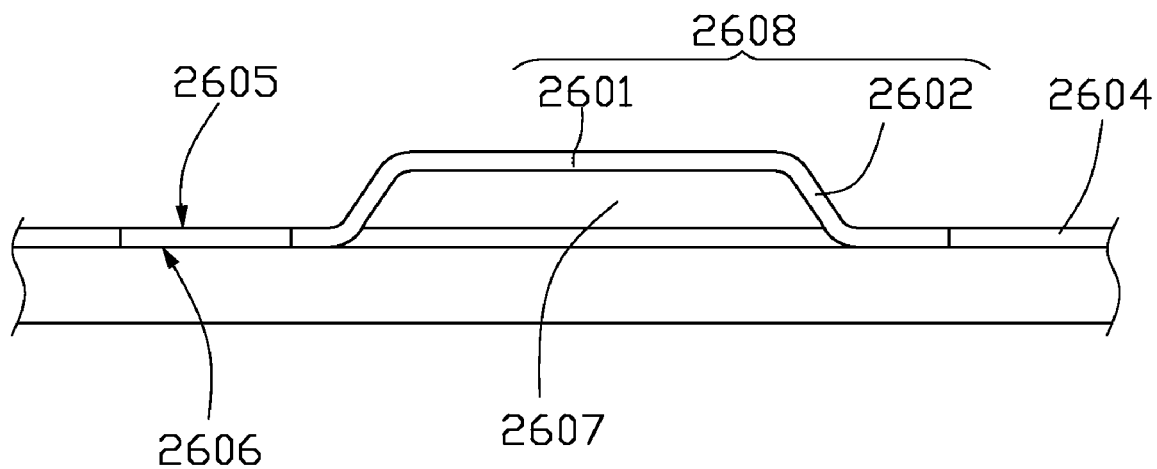
FIG. 6 is a side elevational view of a protruding member of the fixing frame of the lid of FIG. 5.

The fixing frame 26 includes a first frame portion 260, a second frame portion 262, and a third frame portion 264. The second frame portion 262 is shaped like an elongated-strip. The first frame portion 260 and the third frame portion 264 are perpendicularly bent from opposite ends of the second frame portion 262. The first frame portion 260 includes an elongated main board 2604 which has a top surface 2605, a bottom surface 2606, and a protruding member 2608 extending upwardly from a central portion of the main board 2604. The protruding member 2608 is preferably formed by punching the main board 2604 of the first frame portion 260 from the bottom surface 2606 towards the top surface 2605. Therefore, a concave hollow 2607 corresponding to the protruding member 2608 is formed on the bottom surface 2606 of the first frame portion 260 after the punching process. Referring to FIGS. 5, 6, the protruding member 2608 is U-shaped, which includes an elongated strip 2601 parallel to the main board 2604 of the first frame portion 260 and two connecting tabs 2602 extending downward from a front end and a rear end of the strip 2601 correspondingly, to connect the protruding member 2608 with the main board 2604.

The magnetic body 42 is mounted on the strip 2601 of the protruding member 2608 of the first frame portion 260. The magnetic body 42 has a bottom side 421 affixed to the top surface of the strip 2601, and a top side 422 opposite to the bottom side 421 facing the top cover 222 of the lid 20.

The magnetic shield member 28 is made of electromagnetic shielding material, such as ferronickel alloy, nickel steel alloy or etc. The magnetic shield member 28 is a slice-shaped in profile. The magnetic shield member 28 is received in the concave hollow 2607 of the first frame portion 260 and is affixed to the bottom surface of the strip 2601 of the protruding member 2608.

Alternatively, the first frame portion 260 may be made of the electromagnetic shielding material and the magnetic shield member 28 can be omitted accordingly. Moreover, the shape of the magnetic shield member 28 may be different, for example, the magnetic shield member 28 can be designed to define an inner space for enclosing the magnetic body 42 therein exposing the top side 422 of the magnetic body 42 to face the magnetic detector 44.

When assembled, the magnetic body 42 is fixedly connected to the top surface 2605 of the first frame portion 260 and the magnetic shield member 28 is fixedly connected to the bottom surface 2606 of the first frame portion 260. The bottom surface 2606 of the main board 2604 of the first frame portion 260 is in contact with the bottom wall 2200 of the bottom cover 220. The top side 422 of the magnetic body 42 is interferentially attached with the top wall 2220 of the top cover 222. During operation, the lid 20 is pivoted with respect to the main body 30 between the open position and the closed position, and the magnetic detector 44 detects the position of the lid 20 according to the magnetic field intensity of the magnetic body 42. When the lid 20 is in the closed position, the magnetic detector 44 and the magnetic body 42 face each other. The magnetic detector 44 detects a strong magnetic field intensity of the magnetic body 42, and outputs a signal to turn off the screen 24 of the electronic apparatus 10.

The magnetic shield member 28 is disposed at a distance from the top side 422 and adjacent to the bottom side 421 of the magnetic body 42. Therefore, the intensity of the magnetic field at a distance from the bottom side 422 and adjacent to the top side 421 of the magnetic body 42 is attenuated by the magnetic shield member 28, which prevents the magnetic field generated by the magnetic magnet body 40 from attracting magnetic substance such as the metallic keys located adjacent to the magnetic body 42 of the electronic apparatus 10.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic apparatus comprising:
a main body;
a lid pivotably connected with a side of the main body to rotate with respect to the main body between an open position and a closed position; and
a power saving switch comprising:
a magnetic detecting unit comprising a magnetic body mounted on one of the main body or the lid, and a magnetic detector mounted on the other one of the main body or the lid, respectively, the magnetic body having a facing side to face the magnetic detector, the magnetic detector detects a position of the lid according to a magnetic field intensity of the magnetic body;
a magnetic shield member disposed at a distance from the facing side and adjacent to a second side of the magnetic body, to prevent the magnetic field from extending in the direction of the second side of the magnetic body; and
a fixing frame for fixing the magnetic body, the fixing frame comprising a main board, and a protruding member upwardly protruding from the main board, the magnetic body and the magnetic shield member set on the two opposite sides of the protruding member of the fixing frame respectively; the protruding member supporting the magnetic body such that the magnetic body is near the magnetic detector when the lid covers on the main body.

2. The electronic apparatus of claim 1, wherein the magnetic shield member encloses the magnetic body therein and exposing the facing side of the magnetic body.

3. The electronic apparatus of claim 1, wherein the magnetic shield member is made of electromagnetic shielding material.

4. The electronic apparatus of claim 1, wherein the lid comprises a shell defining an inner space therein, the fixing frame is received in the inner space, the magnetic body and the magnetic shield member are fixed in the inner space of the lid by the fixing frame.

5. The electronic apparatus of claim 4, wherein the main board of the fixing frame and the magnetic body are attached to a top surface and a bottom surface of the inner space of the shell respectively.

6. The electronic apparatus of claim 1, wherein the lid comprises a shell defining an inner space therein, the fixing frame is received in the inner space, the magnetic body is fixed in the inner space of the lid by the fixing frame.

7. The electronic apparatus of claim 6, wherein the fixing frame is made of electromagnetic shielding material.

8. The electronic apparatus of claim 6, wherein the main board has a top surface and a bottom surface, the protruding member extends upwardly from the bottom surface towards the top surface, the magnetic body is mounted on the top surface of the protruding member of the fixing frame.

9. The electronic apparatus of claim 8, wherein the protruding member comprises a strip parallel to the main board of the fixing frame and two connecting tabs extending from two opposite ends of the strip respectively to connect with the main board, the main board of the fixing frame and the magnetic body are attached to a top surface and a bottom surface of the inner space of the shell respectively.

10. The electronic apparatus of claim 1, wherein the protruding member comprises a strip parallel to the main board and two connecting tabs extending from two opposite ends of the strip respectively to connect with the main board.

11. The electronic apparatus of claim 10, wherein the strip and the two connecting tabs combine to form a hollow to receiving the magnetic shield member.

12. The electronic apparatus of claim 11, wherein the magnetic body and the magnetic shield member are attached to opposite sides of the strip.

13. The electronic apparatus of claim 1, wherein the main board has a top surface and a bottom surface, the protruding member extends upwardly from the bottom surface towards the top surface; the magnetic body and the magnetic shield member connect to the top surface and the bottom surface of the protruding member of the fixing frame respectively.

* * * * *